United States Patent
Kudo et al.

(10) Patent No.: US 11,707,850 B2
(45) Date of Patent: Jul. 25, 2023

(54) SERVO MOTOR DEVICE, AND CONTROL METHOD

(71) Applicants: Futaba Corporation, Mobara (JP); Chiba Institute of Technology, Chiba (JP)

(72) Inventors: Shotaro Kudo, Mobara (JP); Yasuyuki Suzuki, Mobara (JP); Toru Kono, Mobara (JP); Ryosei Kuramoto, Mobara (JP); Hidetoshi Muramatsu, Mobara (JP); Takayuki Furuta, Chiba (JP); Masaharu Shimizu, Chiba (JP); Hideaki Yamato, Chiba (JP)

(73) Assignees: Futaba Corporation, Mobara (JP); Chiba Institute of Technology, Narashino (JP)

( * ) Notice: Subject to any disclaimer, the term of this patent is extended or adjusted under 35 U.S.C. 154(b) by 185 days.

(21) Appl. No.: 17/385,362

(22) Filed: Jul. 26, 2021

(65) Prior Publication Data
US 2022/0024049 A1    Jan. 27, 2022

(30) Foreign Application Priority Data
Jul. 27, 2020 (JP) ................... 2020-126614

(51) Int. Cl.
| H02P 29/00 | (2016.01) |
| B25J 13/08 | (2006.01) |
| B25J 9/12 | (2006.01) |
| B25J 9/10 | (2006.01) |
| B25J 9/16 | (2006.01) |

(52) U.S. Cl.
CPC ............ B25J 13/088 (2013.01); B25J 9/102 (2013.01); B25J 9/126 (2013.01); B25J 9/1633 (2013.01); B25J 9/1674 (2013.01)

(58) Field of Classification Search
CPC . B25J 9/102; B25J 9/1633; H02P 6/00; H02P 6/28; H02P 7/00; H02P 7/18
See application file for complete search history.

(56) References Cited

U.S. PATENT DOCUMENTS

| 2006/0028164 A1* | 2/2006 | Kono | B25J 9/08 318/625 |
| 2014/0107837 A1* | 4/2014 | Tsai | H02P 1/00 700/245 |
| 2015/0328774 A1 | 11/2015 | Yajima et al. | |

FOREIGN PATENT DOCUMENTS

JP    P2015-217568 A    12/2015

* cited by examiner

*Primary Examiner* — Muhammad S Islam
(74) *Attorney, Agent, or Firm* — Quarles & Brady LLP

(57) ABSTRACT

An objective of the present invention is to reduce the downtime which occurs when changing a servo motor device. A servo motor device includes a motor section and a reduction gear configured to output a driving force by reducing a speed of rotation of the motor section, wherein a control device includes a detecting section configured to acquire detected information about operation of the motor section, and a computing section configured to generate an approximate curve based on a behavior for a time sequence of a parameter and to calculate predicted lifetime information of the servo motor device based on the approximate curve thus generated, wherein the parameter has been calculated by means of the detected information.

5 Claims, 5 Drawing Sheets

| | ANGULAR ACCELERATION (rad/s²) | | | | | |
|---|---|---|---|---|---|---|
| ANGULAR SPEED (rad/s) | -1000~ -667 | -666~ -333 | -332~ 0 | 1~ 333 | 334~ 667 | 666~ 1000 |
| -500~-334 | 0 | 0 | 0 | 0 | 0 | 0 |
| -333~-167 | 0 | 0 | -400 | 450 | 0 | 0 |
| -166~0 | 0 | 0 | 0 | 400 | 0 | 0 |
| 1~166 | 0 | 0 | 0 | 0 | 0 | 0 |
| 167~333 | 0 | 0 | 0 | 0 | 0 | 0 |
| 334~500 | 0 | 0 | 0 | 0 | 0 | 0 |

CURRENT VALUE

FIG.2

| ANGULAR SPEED (rad/s) \ ANGULAR ACCELERATION (rad/s²) | -1000~-667 | -666~-333 | -332~0 | 1~333 | 334~667 | 666~1000 |
|---|---|---|---|---|---|---|
| -500~-334 | 2 | 4 | 6 | 6 | 7 | 5 |
| -333~-167 | 4 | 6 | 11 | 11 | 13 | 7 |
| -166~0 | 4 | 8 | 12 | 15 | 12 | 6 |
| 1~166 | 6 | 11 | 16 | 18 | 11 | 6 |
| 167~333 | 5 | 8 | 12 | 15 | 8 | 4 |
| 334~500 | 2 | 5 | 7 | 5 | 4 | 2 |

FIG.6

SERVO MOTOR DEVICE, AND CONTROL METHOD

CROSS-REFERENCE TO RELATED APPLICATION

This application claims the priority benefit of Japanese Patent Application No. 2020-126614 filed Jul. 27, 2020, which is fully incorporated herein by reference.

BACKGROUND OF THE INVENTION

Technical Field

The present invention relates to the fields of a servo motor device and a control method therefor, more particularly to the fields of lifetime prediction of a servo motor device.

Background Art

In recent years, a servo motor device is used e.g. in a collaborative robot. Patent Document 1 discloses that when a fault is detected with regard to operation of a collaborative robot, a servo motor device with the fault is determined based on operation information for the collaborative robot before the fault is detected.

CITATION LIST

Patent Literature

Patent Document 1: JP 2015-217468 A

SUMMARY OF THE INVENTION

For such a servo motor device installed e.g. in a collaborative robot, its production lifetime is ended and a fault occurs in the servo motor device due to long-term usage. When a fault occurs in the servo motor device, a user will order a delivery of a new servo motor device for change and/or order a supplier of the collaborative robot to perform a change operation of the servo motor device. However, a time for which the collaborative robot cannot operate occurs during a time from the new servo motor device is ordered to be delivered until the change is completed (downtime). In order to reduce such a downtime, it is necessary to predict a time period until the lifetime of the servo motor device is ended, and to get ready for the change in advance.

Therefore, an objective of the present invention is to reduce the downtime by predicting the lifetime of the servo motor device, wherein the downtime occurs when changing the servo motor device.

A servo motor device according to the present invention includes a motor section configured to generate a driving force, and a reduction gear configured to output the driving force by reducing a speed of rotation for the motor section, wherein the servo motor device further includes a detecting section configured to acquire detected information about operation of the motor section, and a computing section configured to generate an approximate curve based on a behavior for a time sequence of a parameter and to calculate predicted lifetime information of the servo motor device based on the approximate curve thus generated, wherein the parameter has been calculated by means of the detected information. In this manner, it is possible to inform a user about when the servo motor device should be changed, before the lifetime of the servo motor device is ended.

Further, the lifetime prediction of the servo motor device is not accomplished on a main controller e.g. of a robot device with the servo motor device installed therein, but by the servo motor device itself. The parameter calculated by means of the detected information here is e.g. a torque constant, an inertial moment, a viscous resistance, a static friction coefficient, a gravity influence coefficient, a backlash amount, an energy efficiency, a high frequency vibration coefficient, a natural frequency, a heat generation coefficient, a heat dissipation coefficient, and/or a maximal static friction force of the reduction gear. Furthermore, the predicted lifetime information is information indicative of a time period which ranges from a time point for acquiring the last detected information to a predicted time point at which the lifetime of the servo motor device is ended (hereinafter also referred to as "remaining lifetime period").

For the servo motor device according to the present invention as described above, it is conceivable that the servo motor device includes a memory section configured to store the detected information in a storage area, wherein the storage area is provided for each predetermined numerical range, and wherein the memory section is configured to store the detected information in a storage zone of the storage area, the storage zone being associated with the predetermined numerical range. In this manner, a plurality of detected informations is stored together which fall within the respective predetermined numerical ranges.

For the servo motor device according to the present invention as described above, it is conceivable that the memory section is configured to store the detected information, wherein averaging has been performed between the detected information and a value previously stored in the associated storage zone. In this manner, a value for the detected information to be stored comes closer to a value which is determined at a center of the predetermined numerical range for the storage area.

A control method according to the present invention is provided to control a servo motor device including a motor section configured to generate a driving force and a reduction gear configured to output the driving force by reducing a speed of rotation for the motor section, the control method including: acquiring detected information about operation of the motor section by the servo motor device; and by the servo motor device, generating an approximate curve based on a behavior for a time sequence of a parameter, and calculating predicted lifetime information of the servo motor device based on the approximate curve thus generated, wherein the parameter has been calculated by means of the detected information.

With the present invention, it is possible to reduce the downtime which occurs when changing the servo motor device.

BRIEF DESCRIPTION OF THE DRAWINGS

FIG. 2 is a conceptual view of a storage area of a memory section according to the embodiment;

FIG. 6 is a conceptual view of the storage area of the memory section according to the embodiment.

DETAILED DESCRIPTION OF THE PREFERRED EMBODIMENTS

Figure 1:
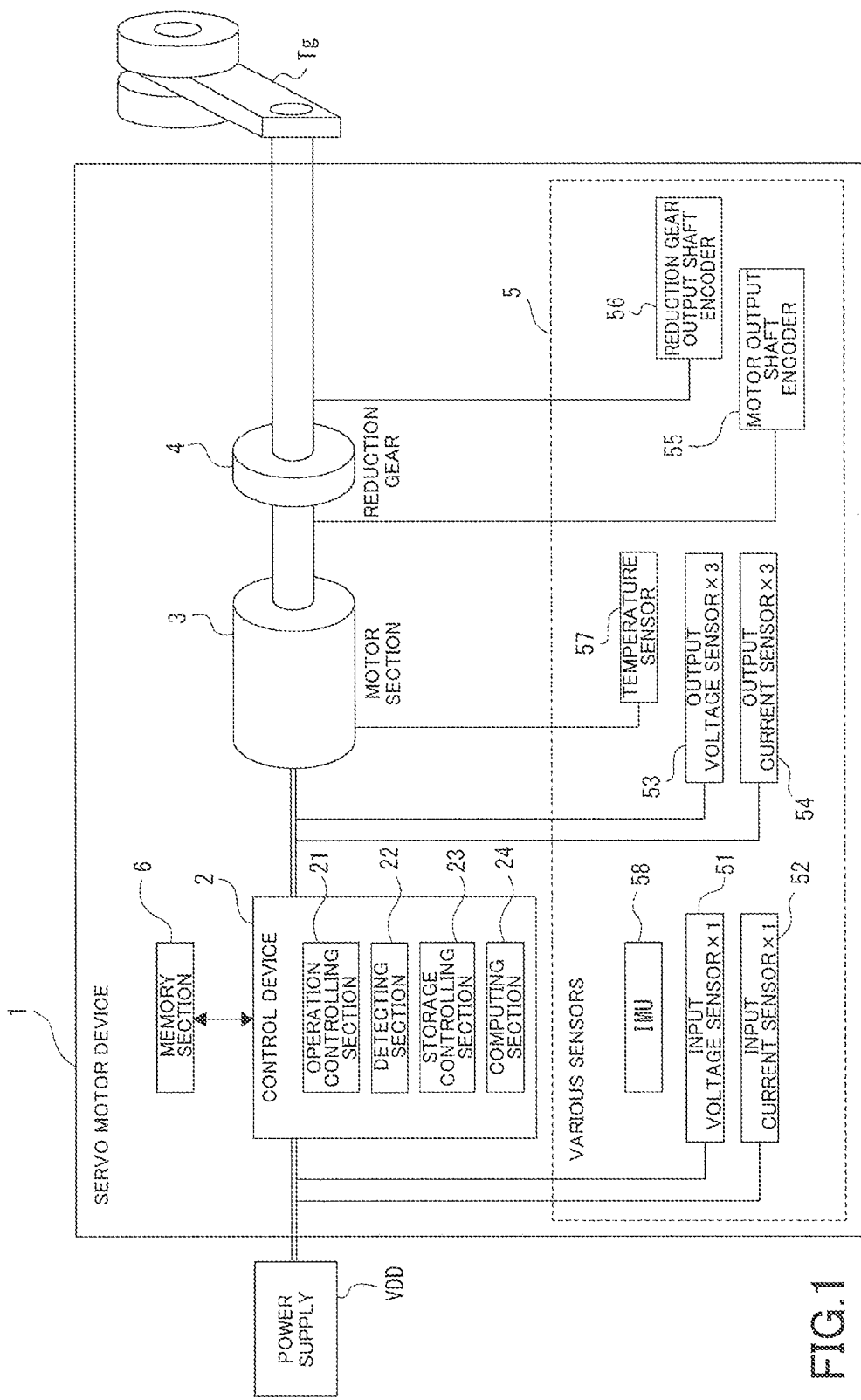
FIG. 1 is a diagram of a structure of a servo motor device according to an embodiment of the present invention.

Hereinafter, an embodiment of the present invention will be described in the following order:
<1. Structure of a servo motor device>
<2. An example for a storage process of detected information>
<3. An example for a calculation process of predicted lifetime information>
<4. Conclusion and exemplar variations>

Referring to FIGS. 1 to 6, the present embodiment will be described. It is to be noted that the Drawings extract and show essential parts considered as necessary for better understanding, and their peripheral configurations, which are partially extracted. It is further to be noted that the Drawings are merely schematic, and that a dimension and a ratio etc. for each of structural features as shown in the Drawings are merely shown by way of example. Therefore, various modifications are possible depending on the design etc. within a scope which does not depart from the technical idea of the present invention.

1. Structure of a Servo Motor Device

FIG. 1 shows an exemplary structure of a servo motor device 1 according to an embodiment of the present invention. The servo motor device 1 is installed in a collaborative robot e.g. as an articulated unit for driving a joint of the collaborative robot, wherein the collaborative robot is configured e.g. to perform an operation in the same space in which a human exits. The servo motor device 1 is operated e.g. based on a control signal from a main controller of the collaborative robot and/or based on a program stored in the servo motor device 1.

It is to be noted that the servo motor device 1 may be also installed in various robots other than an articulated arm robot such as a collaborative robot. The servo motor device 1 may be installed in various robots, for example in a service robot or home robot, more specifically a mobile robot, rideable robot, a transportation robot, an operative unit to be operated with one servo motor device 1 or a combination of servo motor devices 1, or an opening/closing device.

The servo motor device 1 includes a control device 2, a motor section 3, a reduction gear 4, various sensors 5, and a memory section 6.

The control device 2 is configured with a microcomputer which includes e.g. a CPU (Central Processing Unit), ROM (Read Only Memory) and/or RAM (Random Access Memory) etc., wherein the operation of the control device 2 is controlled by the CPU carrying out processes according to a program. The control device 2 has functions of an operation controlling section 21, a detecting section 22, a storage controlling section 23 and a computing section 24.

With respect to the present embodiment, an example will be described in which various functions of the control device 2 are implemented in one CPU. It is to be noted that part or all of the various functions of the control device 2 may be implemented in different CPUs. In this case, the present embodiment may be implemented by the CPUs carrying out the respective processes in parallel.

The operation controlling section 21 in the control device 2 controls the operations of the various devices which constitute the servo motor device 1. The operation controlling section 21 controls the operations of the motor section 3 and/or the reduction gear 4, e.g. according to a predetermined target trajectory. Further, the operation controlling section 21 controls the operations of the motor section 3 and/or the reduction gear 4 based on detected information from the various sensors 5. The operation controlling section 21 provides a control signal to the motor section 3 and/or the reduction gear 4 via an inverter in the control device 2 which is not shown.

The motor section 3 is driven according to the control signal from the operation controlling section 21. The action of an object to be driven Tg by the servo motor device 1 is controlled by driving the motor section 3. The reduction gear 4 reduces a speed of rotation of the motor section 3. The motor section 3 and the reduction gear 4 are geared motors which each have a rotation shaft and an output shaft coincident with each other.

The motor section 3 is configured e.g. as a brushless DC (Direct Current) motor. It is to be noted that the motor section 3 is not limited to a brushless DC motor, but various motors may be applied. For example, the motor section 3 may be a DC motor with brush. A driving force generated by the motor section 3 is transferred via the reduction gear 4 to the object to be driven Tg by the collaborative robot, wherein the reduction gear 4 reduces the speed of rotation of the motor section 3.

The detecting section 22 in the control device 2 acquires detected information about operation of the motor section 3 (hereinafter also referred to simply as "detected information"). The detecting section 22 acquires detected information from the various sensors 5 in the servo motor device 1.

The various sensors 5 are e.g. an input voltage sensor 51, an input current sensor 52, an output voltage sensor 53, an output current sensor 54, an motor output shaft encoder 55, a reduction gear output shaft encoder 56, a temperature sensor 57, and an IMU (Inertial Measurement Unit) 58.

The input voltage sensor 51 detects a voltage input to the control device 2 from a power supply VDD. The input voltage sensor 51 is provided between the power supply VDD and the control device 2. For example, one input voltage sensor 51 is provided.

The input current sensor 52 detects a current input to the control device 2 from the power supply VDD. The input current sensor 52 is provided between the power supply VDD and the control device 2. For example, one input current sensor 52 is provided.

The output voltage sensor 53 detects a voltage output to the motor section 3 from the control device 2 as the detected information. The output voltage sensor 53 further detects a counter-electromotive force as the detected information by disconnecting the inverter driving during rotation of the motor section 3.

The output voltage sensor 53 is provided between the control device 2 and the motor section 3. In the case of the motor section 3 being configured as a brushless DC motor, three output voltage sensors 53 are provided. It is to be noted that how many output voltage sensors 53 should be used may vary depending on a type of the motor section 3, wherein e.g. in the case of the motor section 3 being configured as a DC motor with brush, it is necessary to provide only one output voltage sensor 53.

The output current sensor 54 detects a current output to the motor section 3 from the control device 2 as the detected information. The output current sensor 54 is between the control device 2 and the motor section 3. In the case of the motor section 3 being configured as a brushless DC motor, three output current sensors 54 are provided. It is to be noted that how many output current sensors 54 should be used may vary depending on a type of the motor section 3, wherein e.g. in the case of the motor section 3 being configured as a DC motor with brush, it is necessary to provide only one output current e sensor 54.

The motor output shaft encoder 55 detects a rotation angle and an angular speed of the output shaft of the motor section 3 (hereinafter referred to as "motor output shaft") as the detected information. The motor output shaft encoder 55 is provided at the motor output shaft.

The reduction gear output shaft encoder 56 detects a rotation angle and an angular speed of the output shaft of the reduction gear 4 (hereinafter referred to as "reduction gear output shaft") as the detected information. The reduction gear output shaft encoder 56 is provided at the reduction gear output shaft.

The temperature sensor 57 is provided at the motor section 3, and detects a temperature of the motor section 3 as the detected information.

The IMU 58 detects an angle of the servo motor device 1 relative to ground as the detected information from an acceleration sensor and/or gyrosensor installed therein. With the IMU 58 being installed in the servo motor device 1, it is possible to detect the angle of the servo motor device 1 relative to ground, regardless of an angle for mounting the servo motor device 1 on the collaborative robot. As the detected information, the IMU 58 further detects vibration of the servo motor device 1 due to the rotation of the motor section 3.

Each of the various sensors 5 acquires the detected information as described above, and provides the acquired detected information to the control device 2. This means that the detected information for the lifetime prediction can be acquired by the various sensors 5 in the servo motor device 1, without mounting an external device in the servo motor device 1.

The storage controlling section 23 in the control device 2 causes the memory section 6 to store therein the detected information acquired by the detecting section 22. The memory section 6 is configured e.g. as RAM. It is to be noted that the memory section 6 may be a removable storage media such as a memory card, an optical disc, a magnetic tape or the like. The memory section 6 may be also a stationary HDD (Hard Disk Drive), a semiconductor memory module or the like. Further, the memory section 6 may be provided in the control device 2. For example, RAM in the control device 2 may serve as the memory section 6.

The memory section 6 includes a storage area for storing the detected information in a multi-dimensional array according to types of the detected information. The detected information is stored in the storage area for each of predetermined numerical ranges.

For example, the storage area of the memory section 6 has a two-dimensional array as shown in FIG. 2. According to FIG. 2, the storage area is divided into columns at an interval of approximately 333 rad/s² for an angular acceleration of the motor shaft, and into rows at an interval of approximately 166 rad/s for an angular speed of the motor shaft, for example. Then, each of cells thus divided stores a current value associated with predetermined numerical ranges for the angular acceleration and the angular speed of the cell. In this manner, the detected information acquired from the various sensors 5 is stored in the memory section 6. A process for storing the detected information will be described below. It is to be noted that the storage area of the memory section 6 may have a multi-dimensional array with three or more dimensions depending on how many detected informations are used, although FIG. 2 shows an example with the two-dimensional array.

The computing section 24 in the control device 2 acquires the detected information of the various sensors 5 from the memory section 6. Based on the acquired detected information, the computing section 24 calculates (identifies) a lifetime prediction parameter for the lifetime prediction of the servo motor device 1.

The lifetime prediction parameter is a value which is indicated by a physical quantity, such as a torque constant, an inertial moment, a viscous resistance, a static friction coefficient, a gravity influence coefficient, a backlash amount, an energy efficiency, a high frequency vibration coefficient, a natural frequency, a heat generation coefficient, a heat dissipation coefficient, and/or a maximal static friction force of the reduction gear 4. A process for calculating the various lifetime prediction parameters will be described in more details below.

The computing section 24 further calculates predicted lifetime information of the servo motor device 1 based on the calculated lifetime prediction parameter(s). The computing section 24 calculates the predicted lifetime information of the servo motor device 1 based on the lifetime prediction parameter(s) as described above. It is to be noted that it is necessary to calculate at least one of the various lifetime prediction parameters as described above in order to allow the computing section 24 to perform the lifetime prediction for the servo motor device 1.

The control device 2 transmits the calculated predicted lifetime information e.g. to the main controller of the collaborative robot, via a wireless or wired communication. Based on the predicted lifetime information received from the control device 2, the main controller causes, before the production lifetime of the servo motor device 1 is ended, that a user is informed so as to be able to recognize that the time is approaching at which the lifetime of the servo motor device 1 is ended (it is recommended to change the servo motor device 1).

Since a certain length of time is provided from the recommended time for changing to the end of the lifetime of the servo motor device 1, the user who has confirmed that it is the recommended time for changing prepares for the change, e.g. orders a servo motor device 1 for change. In this manner, a time period can be ensured until the servo motor device 1 is changed, so that a substitute servo motor device 1 can be prepared before the lifetime of the servo motor device 1 is ended. This enables the downtime to be reduced which may occur when changing the servo motor device 1.

2. An Example for a Storage Process of Detected Information

Figure 3:
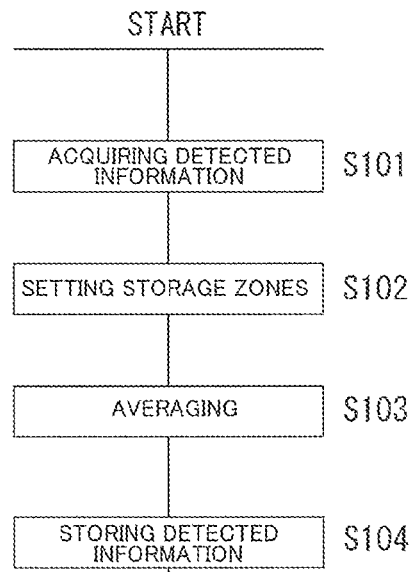
FIG. 3 is a flowchart for processes carried out by a control device according to the embodiment.

Referring to FIG. 3, an example for storing the detected information will be described which is carried out by the control device 2 for implementing the present embodiment.

First, in step S101, the control device 2 acquires the detected information from the various sensors 5 as described above. The various sensors 5 and the detected information acquired from the sensors 5 have the following relation to each other:

Input voltage sensor 51: voltage input to the control device 2

Input current sensor 52: current input to the control device 2

Output voltage sensor 53: counter-electromotive force, and voltage output to the motor section 3

Output current sensor 54: current output to the motor section 3

Motor output shaft encoder 55: rotation angle and angular speed of the motor output shaft Reduction gear output shaft encoder 56: rotation angle and angular speed of the reduction gear output shaft Temperature sensor 57: temperature of the motor section 3

IMU 58: angle of the servo motor device 1 relative to ground, and vibration of the servo motor device 1

In the following step S102, the control device 2 sets storage zones for storing the detected information in the storage area of the memory section 6. The storage area includes a plurality of cells which is delimited for different predetermined numerical ranges, as shown in FIG. 2. The control device 2 sets a cell(s) of the storage area as the storage zone(s), the cell(s) being provided for the predetermined numerical range(s) within which the detected information falls.

Subsequently, in step S103, the control device 2 performs an averaging operation between detected information previously stored in the storage zone which have been thus set, and the detected information to be now stored. Then, in step S104, the control device 2 stores the averaged detected information in the storage zone.

After the process in step S104, the control device 2 ends the process according to FIG. 3. The control device 2 repeats the process according to FIG. 3 during operating the collaborative robot. In the above-described manner, the detected information by the various sensors 5 is stored in the memory section 6.

3. An Example for a Calculation Process of Predicted Lifetime Information

Figure 4:
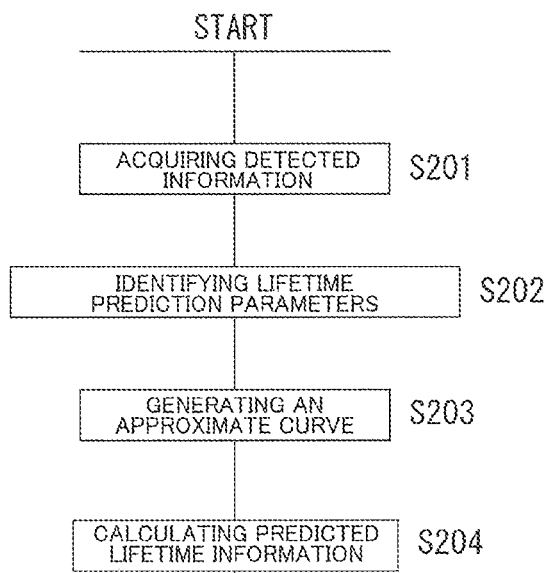
FIG. 4 is a flowchart for processes carried out by the control device according to the embodiment.

Referring to FIG. 4, an example for calculation of the predicted lifetime information will be described which is carried out by the control device 2 for implementing the present embodiment.

First, in step S201, the control device 2 acquires the detected information detected by the sensors 5 from the memory section 6. Then, in step S202, the control device 2 calculates (identifies) the lifetime prediction parameter for use in the lifetime prediction of the servo motor device 1 based on the acquired detected information.

The lifetime prediction parameter is e.g. a torque constant, an inertial moment, a viscous resistance, a static friction coefficient, a gravity influence coefficient, a backlash amount, an energy efficiency, a high frequency vibration coefficient, a natural frequency, a heat generation coefficient, a heat dissipation coefficient, and/or a maximal static friction force of the reduction gear 4. Hereinafter, a method for identifying these various parameters will be described.

(1) Torque Constant

As the detected information, the control device 2 acquires the counter-electromotive force detected by the output voltage sensor 53, and the angular speed of the motor output shaft detected by the motor output shaft encoder 55 from the memory section 6. A value $\omega^+$ is defined according to Formula 1 as described below, and the torque constant is identified by the control device 2.

$$v_{rms} = \omega k_v \quad \text{[Formula 1]}$$
$$\omega^+ := (\omega^T \omega)^{-1} \omega$$
$$k_v = \omega^+ v_{rms}$$
$$k_t = k_v$$

In the Formula 1,
$V_{rms}$ indicates the counter-electromotive force,
$\omega$ indicates the angular speed of the motor output shaft,
$k_v$ indicates a counter-electromotive force constant, and
$k_t$ indicates a torque constant.

The control device 2 identifies the counter-electromotive force constant based on a measurement dataset of different angular speeds and counter-electromotive forces using a pseudo inverse matrix. Since the counter-electromotive force constant is equivalent to the torque constant, the control device 2 identifies the torque constant by identifying the counter-electromotive force constant. For the value $\omega$, instead of the angular speed of the motor output shaft, it is possible to use the angular speed of the reduction gear output shaft detected by the reduction gear output shaft encoder 56. This also enables the torque constant to be identified in a similar manner.

(2) Identification of the Inertial Moment, Viscous Resistance, Static Friction Coefficient, and Gravity Influence Coefficient As the detected information, the control device 2 acquires the counter-electromotive force detected by the output voltage sensor 53, the current detected by the output current sensor 54, the rotation angle and the angular speed of the motor output shaft detected by the motor output shaft encoder 55, and the angle of the servo motor device 1 relative to ground detected by the IMU 58 from the memory section 6.

Further, the control device 2 identifies the torque constant according to the Formula 1 as mentioned above. The control device 2 identifies the inertial moment, viscous resistance, static friction coefficient, gravity influence coefficient according to Formula 3 which is the modified Formula 2 as described below.

$$k_t I = J\frac{d}{dt}\omega + B\omega + C\mathrm{sign}(\omega) + D\sin(\theta) + E\cos(\theta) \quad \text{[Formula 2]}$$

$$I = \frac{J}{k_t}\frac{d}{dt}\omega + \frac{B}{k_t}\omega + \frac{C}{k_t}\mathrm{sign}(\omega) + \frac{D}{k_t}\sin(\theta) + \frac{E}{k_t}\cos(\theta) \quad \text{[Formula 3]}$$

In the Formulas 2 and 3,
$\omega$ indicates the angular speed of the motor output shaft,
$k_t$ indicates the torque constant,
$\mathrm{sign}(\omega)$ is a function which returns either 1, −1 or 0 for a value of the angular speed depending on its sign,
$\theta$ indicates the angle of the motor output shaft relative to ground,
J indicates the inertial moment,
B indicates the viscous resistance,
C indicates the static friction coefficient,
D and E indicate gravity influence coefficients, and
I indicates a current flowing through the motor section 3.

Here, the angle of the motor output shaft relative to ground is calculated by adding the rotation angle of the motor output shaft to an angle of the servo motor device 1 relative to ground. Further, (d/dt) $\omega$ in the Formulas 2 and 3 is calculated by time derivation of the angular speed of the motor output shaft detected by the motor output shaft encoder 55. It is to be noted that derivation of the measured angular speed without removing a noise component may lead to a significant deviation of the value for (d/dt)ω from its true value. Therefore, the control device 2 perform the derivation of the measured angular speed data under noise processing e.g. by means of SG (Savitzky Golay) method. For the value ω, instead of the angular speed of the motor output shaft, it is also possible to use the angular speed of the reduction gear output shaft detected by the reduction gear output shaft encoder 56. This also enables the torque constant to be identified in a similar manner. In this case, the value θ is calculated by adding the rotation angle of the reduction gear output shaft to the angle of the servo motor device 1 relative to ground.

The values J, B, C, D and E are parameters specific to the motor section 3 and unknown, and therefore, these values are identified from a plurality of measurement data according to the following Formula 4:

$$W := \begin{bmatrix} \frac{d}{dt}\omega & \omega & \text{sign}(\omega) & \sin(\theta) & \cos(\theta) \end{bmatrix}$$ [Formula 4]

$$X := \begin{bmatrix} \frac{J}{k_t} \\ \frac{B}{k_t} \\ \frac{C}{k_t} \\ \frac{D}{k_t} \\ \frac{E}{k_t} \end{bmatrix}$$

$$I = WX$$

$$W^+ := (W^T W)^{-1} W^T$$

$$X = W^+ I$$

Since the value $k_t$ for the torque constant is known from the above-mentioned Formula 1, the control device 2 defines the values W, X and W$^+$ according to the Formula 4, and identifies the values J, B, C, D and E.

(3) Backlash Amount

The control device 2 acquires the rotation angle of the motor output shaft detected by the motor output shaft encoder 55, and the rotation angle of the reduction gear output shaft detected by the reduction gear output shaft encoder 56 as the detected information from the memory section 6. The control device 2 identifies the backlash amount according to the following Formula 5:

$$j_\theta = \theta_L - \frac{\theta_M}{n}$$ [Formula 5]

In the Formulas 5,
θ$_L$ indicates the rotation angle of the reduction gear output shaft,
θ$_M$ indicates the rotation angle of the motor output shaft,
j$_θ$ indicates the backlash amount, and
n indicates a reduction ratio.
The rotation angle measurement is performed at a plurality of angles, wherein a unique value is determined by means of a least squares method.

(4) Energy Efficiency

The energy efficiency as used herein is an inverter efficiency of the control device 2 and a motor efficiency of the motor section 3. First, an identification method for the inverter efficiency will be described. For identification of the inverter efficiency, the control device 2 acquires the input voltage to the control device 2 detected by the input voltage sensor 51, the input current to the control device 2 detected by the input current sensor 52, the output voltage to the motor section 3 detected by the output voltage sensor 53, and the output current to the motor section 3 detected by the output current sensor 54 as the detected information from the memory section 6.

The control device 2 calculates an inverter input energy from the input voltage and the input current to the control device 2. Further, the control device 2 calculates an inverter output energy from the output voltage and the output current to the motor section 3. Then, the control device 2 defines a value W$^+_{in}$ according to the following Formula 6, and identifies the inverter efficiency. It is to be noted that since the inverter efficiency may vary depending on the output values, the control device 2 performs a plurality of measurements of the input energy for an arbitrary value of the output energy.

$$W_{out\_inv} = W_{in}\eta_{inv}$$ [Formula 6]

$$W^+_{in} := (W_{in}^T W_{in})^{-1} W_{in}^T$$

$$\eta_{inv} = W^+_{in} W_{out\_inv}$$

In the Formula 6,
W$_{in}$ indicates the inverter input energy,
W$_{out\_inv}$ indicates the inverter output energy, and
η$_{inv}$ indicates the inverter efficiency.

Next, a method for identifying the motor efficiency will be described. First, the control device 2 calculates the motor output energy according to the following Formula 7:

$$W_{out} = K_t I \omega$$ [Formula 7]

In the Formula 7,
W$_{out}$ indicates the motor output energy,
K$_t$ indicates a torque constant,
I indicates a current flowing through the motor section 3.
ω indicates the angular speed of the motor output shaft.
The torque constant K$_t$ is calculated according to a similar method to that according to the above-mentioned Formula 1.

Further, since the motor input energy is equivalent to the inverter output energy, the control device 2 defines the W$^+_{in\_mot}$ according to the following Formulas 8 and 9, and then calculates the motor input energy:

$$W_{in\_mot} = W_{out\_inv}$$ [Formula 8]

In the Formula 8,
W$_{out}$ indicates the motor output energy, and
W$_{in}$ mot indicates the motor input energy.
The value W$_{out}$ for the motor output energy is calculated according to the above-mentioned Formula 7.

The control device 2 identifies the motor efficiency by means of the motor output energy and the motor input energy according to the following Formula 9, wherein the motor output energy and the motor input energy have been measured at multiple times.

$$W_{out} = W_{in\_mot}\eta_{mot} \qquad \text{[Formula 9]}$$

$$W_{in\_mot}^+ := (W_{in\_mot}^T W_{in\_mot})^{-1} W_{in\_mot}^T$$

$$\eta_{mot} = W_{in\_mot}^+ W_{out}$$

In the Formula 9, $W_{out}$ indicates the motor output energy, $W_{in\_mot}$ indicates the motor input energy, and $\eta_{mot}$ indicates the inverter efficiency.

The value $W_{out}$ for the motor output energy is calculated according to the above-mentioned Formula 7. Further, the value $W_{in\_mot}$ for the motor input energy is calculated according to the Formula 8.

(5) High Frequency Vibration Coefficient and Natural Frequency

For identifying the high frequency vibration coefficient and natural frequency, the control device 2 acquires vibration information of the servo motor device 1 detected by the IMU 8 as the detected information from the memory section 6.

The control device 2 applies an FFT (Fast Fourier Transform) analysis to the acquired vibration information in order to identify a vibration coefficient for each of high wavelengths of the vibration frequency (high wavelength vibration coefficient) from an amplitude(s) of the high wavelengths for a number of revolutions.

Further, the control device 2 estimates the natural frequency of the servo motor device 1 including a load by measuring the vibration for different numbers of revolutions of the motor section 3.

(6) Heat Generation Coefficient and Heat Dissipation Coefficient

For identifying the heat generation coefficient and heat dissipation coefficient of the motor section 3, the control device 2 acquires the temperature of the motor section 3 detected by the temperature sensor 57 as the detected information from the memory section 6.

Main factors which cause heat generation in the motor section 3 are a copper loss and an iron loss in the motor, and a heat generation due to friction in the reduction gear 4. Therefore, the current and the rotational speed of the motor are factors which determine an amount of generated heat. In addition, a hysteresis loss and an eddy current loss of the iron loss of the motor may vary depending on a frequency of a current through a coil, wherein in the case of a brushless DC motor (motor section 3), the frequency through the coil is proportional to the number of revolutions of the motor. Therefore, the control device 2 identifies the heat generation coefficient and heat dissipation coefficient of the motor section 3 according to the Formula 10:

$$T_n + T_{n-1} = R_a I^2 + K_e \omega^2 + K_a \omega + K_b(T_0 - T_{n-1}) \qquad \text{[Formula 10]}$$

In the Formula 10, $T_n$ indicates a current temperature of the motor section 3, $T_{n-1}$ indicates a temperature of the motor section 3 which was previously detected, $T_0$ indicates an atmospheric temperature, $R_a$ indicates a resistance value of the motor, $K_e$ indicates an eddy current loss coefficient, $K_a$ indicates a speed-proportional loss coefficient, and $K_b$ indicates a heat dissipation coefficient of the motor section 3.

The atmospheric temperature as used herein is a temperature of the motor section 3 after expiration of a sufficient time length after the motor has been stopped. Furthermore, the value $K_a$ for the speed-proportional loss coefficient is obtained by adding a loss due to friction to the hysteresis loss. It is to be noted that in the case where a heat generation due to the friction is dominant, an approximation is also possible by using only the terms of the values $K_e$ and $K_b$ in the Formula 10. Similarly, in the case where the number of revolutions is low in a usage range and a heat generation due to the current is dominant, an approximation is possible by using only the terms of the values $R_a$ and $K_b$.

(7) Maximal Static Friction Force of the Reduction Gear 4

The control device 2 acquires the detected information from the output current sensor 54, the reduction gear output shaft encoder 56, the temperature sensor 57, the IMU 58 and so on. It is to be noted that instead of the detected information from the reduction gear output shaft encoder 56, the control device 2 may acquire the detected information from the motor output shaft encoder 55.

The control device 2 causes the current output to the motor section 3 (motor current) to be increased from the value "0" so softly to make an influence of the inertia ignorable. The control device 2 then causes the motor current to be increased until the reduction gear output shaft encoder 56 starts to rotate. At this time, the control device 2 acquires a motor current value at the beginning of the rotation of the reduction gear output shaft encoder 56 from the output current sensor 54, and causes the memory section 6 to store the motor current value therein. The control device 2 performs a series of processes as described above in both of a forward direction and an inverse direction of rotation of the output shaft at different positions of the reduction gear output shaft, wherein the control device 2 acquires a motor current value for each of different angles θ of the output shaft, and then causes the memory section 6 to store the motor current values therein.

The control device 2 identifies the maximal static friction force of the reduction gear 4 according to the following Formula 11. Here, for identifying the maximal static friction force of the reduction gear 4, the control device 2 uses the angles θ, current values and the torque constant stored in the memory section 6. The torque constant may be identified e.g. from the Formula 1 as described above.

$$\tau_{smax} = \tau_{mot} \tau_g \sin(\theta) \qquad \text{[Formula 11]}$$

In the Formula 11, $\tau_{smax}$ indicates the maximal static friction force, $\tau_{mot}$ indicates a motor torque at the beginning of the rotation, and $\tau_g$ indicates a force oriented vertically downward which is caused due to an eccentric load.

With the method as described above, the control device 2 identifies the various lifetime prediction parameters in step S202. It is to be noted that the control device 2 may identify all of the various lifetime prediction parameters, or only any one or some of the parameters. It is possible to preset in an any manner which of the lifetime prediction parameters should be identified.

Subsequently, in step 203, the control device 2 generates an approximate curve based on behaviors in time sequences of the lifetime prediction parameters which have been thus calculated (identified). Then, in step S204, the control device 2 calculates predicted lifetime information of the servo motor device 1 based on the generated approximate curve. The control device 2 generates an approximate curve for each of identified lifetime prediction parameters, and then, calculates predicted lifetime information for each of the lifetime prediction parameters.

Figure 5:
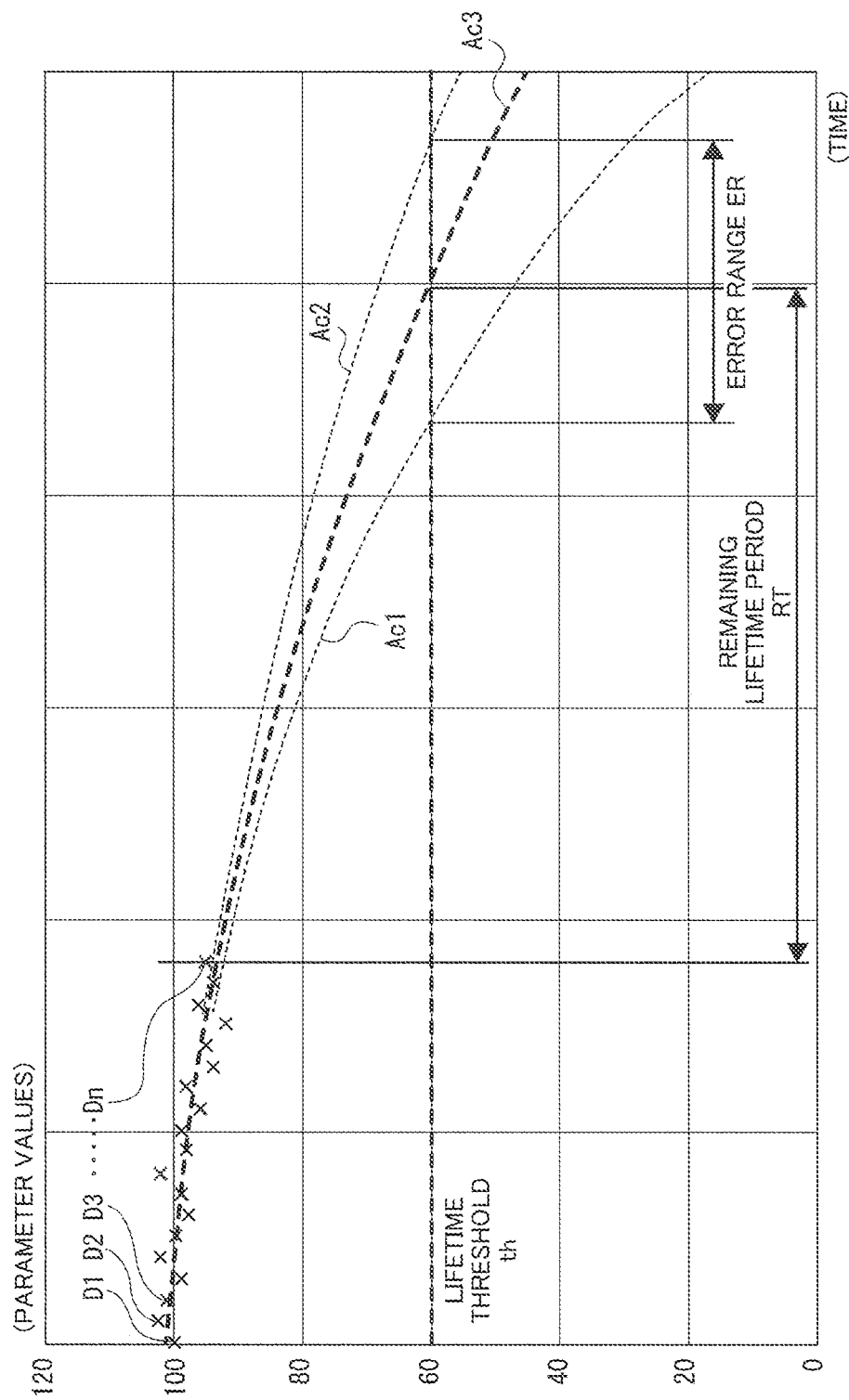
FIG. 5 is a conceptual view for a calculating function of predicted lifetime information according to the embodiment.

FIG. 5 shows a conceptual view for a calculating function of the predicted lifetime information. The diagram shown in FIG. 5 has a time axis extending in the right direction as a horizontal axis, and shows a value of the lifetime prediction parameter on a vertical axis.

First, the control device 2 performs mapping values of the lifetime prediction parameter identified in step S202, to the respective time points in the time sequence (data D1, D2, D3, . . . Dn). Here, data Dn is a last (actual) value of the lifetime prediction parameter which has been identified.

The control device 2 generates the approximate curve which estimates a future behavior of the lifetime prediction parameter from the behavior of the mapped lifetime prediction parameter (data D1 to the actual data Dn of the parameter).

The control device 2 calculates a remaining lifetime period RT as the predicted lifetime information, wherein the remaining lifetime period RT extends from a time point of mapping the actual data Dn to a time point at which the generated approximate curve intersects a lifetime threshold th indicative of the lifetime of the servo motor device 1.

Each of the mapped lifetime prediction parameter includes an error which is caused during the identification. Therefore, the control device 2 generates approximate curves AC1, AC2 which takes the error into account. Here, an error range ER is defined as a range which extends from a time point of intersection between the approximate curve AC1 and the lifetime threshold th to a time point of intersection between the approximate curve AC2 and the lifetime threshold th. In this case, the lifetime period based on an approximate curve AC3 has a highest certainty, the approximate curve AC3 being formed by median values between the approximate curves AC1 and AC2. However, when taking the error into account which is caused during the identification of the lifetime prediction parameter, it is desirable to calculate the predicted lifetime information including the error range ER. Here, an order of the approximate curves etc. is configured in any manner as one which approximates the curves to the behavior of the identified lifetime prediction parameter.

In this manner, calculation of the predicted lifetime information based on the behavior of the approximate curves can result in a reduction of data volume which should be acquired during a development phase, in comparison with methods of lifetime prediction using a machine learning.

After the process in step S204, the control device 2 ends the process according to FIG. 4. The control device 2 repeats the process according to FIG. 4 during operating the collaborative robot. It is to be noted that the control device 2 may perform the process according to FIG. 4 during the operation by the collaborative robot, and/or may perform the process during a preparation phase, such as warm-up operation at switching on a main power supply of the collaborative robot.

Further, the control device 2 may perform storing the detected information (FIG. 3) and calculating the lifetime prediction parameter (FIG. 4) at different times. For example, the control device 2 may store the detected information during operating the collaborative robot, while the control device 2 perform the calculation of the lifetime prediction parameter after ending the operation of the collaborative robot and/or during the preparation phase such as warm-up operation. Further, the control device 2 may be configured to perform storing the detected information and the calculation of the lifetime prediction parameter successively, e.g. during operating the collaborative robot. In the manner described above, the predicted lifetime length (remaining lifetime period RT) of the servo motor device 1 is calculated.

4. Conclusion and Exemplar Variations

In the servo motor device 1 according to the above described embodiment with the motor section 3 configured to generate the driving force, and the reduction gear 4 configured to output the driving force by reducing the speed of rotation for the motor section 3, the control device 2 includes the detecting section 22 configured to acquire the detected information about operation of the motor section 3, and the computing section 24 configured to generate the approximate curve based on the behavior for the time sequence of the lifetime prediction parameter and to calculate the predicted lifetime information (remaining lifetime period RT) of the servo motor device based on the approximate curve thus generated, wherein the lifetime prediction parameter has been calculated by means of the detected information (see e.g. FIGS. 4 and 5). In this manner, it is possible to inform a user about when the servo motor device 1 should be changed, before the lifetime of the servo motor device 1 is ended. This enables the user to design a repair plan for the servo motor device 1 by taking the time for change into account, which allows a servo motor device 1 for change to be ordered in advance before the lifetime is ended. This may result in a reduced downtime which is caused when changing the servo motor device 1. Further, calculation of the predicted lifetime information based on the behavior of the approximate curves can result in a reduction of data volume which should be acquired during a development phase, in comparison with lifetime prediction using a machine learning.

Furthermore, the lifetime prediction of the servo motor device is not accomplished on a main controller of the collaborative robot with the servo motor device 1 installed therein, but by the servo motor device 1 itself. This may result in a reduced load for processing at the main controller of the collaborative robot. This is particularly effective e.g. when a plurality of servo motor devices 1 are mounted as joint units for a collaborative robot.

In the servo motor device 1 according to the present embodiment, the control device 2 calculates (identifies) e.g. any one or more of the torque constant, the inertial moment, the viscous resistance, the static friction coefficient, the gravity influence coefficient, the backlash amount, the energy efficiency, the high frequency vibration coefficient, the natural frequency, the heat generation coefficient, the heat dissipation coefficient, and the maximal static friction force of the reduction gear 4 as the detected information (see e.g. FIG. 4, step S202).

For example, the process for controlling the operation and the calculation of the predicted lifetime information may be improved with regard to their processing efficiency by using as the detected information the torque constant, inertial moment, viscous resistance, static friction coefficient, and gravity influence coefficient which are also used for controlling operations of the motor section 3 and/or the reduction gear 4. Further, a degree of degradation of the inverter in the control device 2 can be also estimated by identifying the inverter efficiency as the energy efficiency.

The servo motor device 1 according to the present embodiment includes the memory section 6 configured to store the detected information in the storage area, wherein the storage area is provided for each predetermined numerical range, and wherein the memory section 6 is configured to store the detected information in a storage zone of the storage area, the storage zone being associated with the predetermined numerical range (see e.g. FIGS. 2 and 3, step S102). In this manner, a plurality of detected informations is stored together which fall within the predetermined numerical range. Accordingly, it is possible to reduce a data volume stored in the memory section 6.

Further, by storing the detected information in the storage area as described above, it is possible to quickly determine whether or not the measured detected information is data which is already stored, so that a wide variety of detected information can be stored with a predetermined maximal number of data.

In the present embodiment, the example for the storage area according to FIG. 2 shows that the storage area is divided in regular intervals into columns at an interval of approximately 333 rad/s$^2$ for the angular acceleration of the motor shaft, and into rows at an interval of approximately 166 rad/s for the angular speed of the motor shaft. However, the division method of the storage area is not limited to that with regular intervals. For example, the storage area may be divided at a smaller interval than approximately 333 rad/s$^2$ near the center of the array, at a interval of approximately 222 rad/s$^2$. In this manner, it is possible to flexibly configure the division interval of the storage area depending on a characteristic of the detected information to be measured.

In the servo motor device 1 according to the present embodiment, the memory section 6 is configured to store the detected information, wherein averaging has been performed between the detected information and a value previously stored in a storage zone of the storage area, the storage zone being associated with a predetermined numerical range (see e.g. FIGS. 2 and 3, step S103). This results in the value for the detected information to be stored which is closer to a value detected at the center in the storage area divided at a interval. Accordingly, a quality of the detected information may be enabled to be improved which is acquired from the memory section 6.

Furthermore, the memory section 6 in the servo motor device 1 may be configured in a multi-dimensional array in which each of storage zones of the storage area associated with the respective predetermined numerical ranges is configured to store a number of data of the detected information which falls within a corresponding predetermined numerical range, namely how many data of the detected information fall within each of the predetermined numerical range.

The storage area of the memory section 6 is configured e.g. in a two-dimensional array, as shown in FIG. 6. According to FIG. 6, the storage area is divided into columns at an interval of approximately 333 rad/s$^2$ for the angular acceleration of the motor shaft, and into rows at an interval of approximately 166 rad/s for the angular speed of the motor shaft, for example. Then, each of cells (storage zones) thus divided stores the numbers of data of the detected information which fall within the predetermined numerical ranges for the angular acceleration and the angular speed of the cell.

For example according to FIG. 6, the number of data of the detected information is stored as "twice" which fall within a range of −1000 to −667 rad/s$^2$ for the angular acceleration of the motor shaft and within a range of −500 to −334 rad/s for the angular speed of the motor shaft. Here, a storage zone for an angular acceleration of 1-333 rad/s$^2$ and for an angular speed of 1-166 rad/s for the motor shaft has a data number of eighteen times which falls within this storage zone, wherein this is determined as a most frequent value.

By acquiring the number of data for each of the storage zones stored in the memory section 6 which falls within the corresponding storage zone, the control device 2 can calculate a coordinate for the most frequent value, a standard deviation, a correlation coefficient, a covariance and so on. In this manner, it is possible to observe a behavior of the coordinate for the most frequent value, standard deviation, correlation coefficient, covariance and so on thus calculated which exist during the same operation or at a time of acquiring a sufficient number of data, so that the lifetime can be predicted based on the observation result, in a similar manner to the other lifetime prediction parameters.

For example, for analyzing a collection of data on the two-dimensional planar basis where the collection of data is stored in a three-dimensional array in the memory section 6, the control device 2 may perform the analysis in parallel to each of planes of the three-dimensional array, or also in a plane which is defined as oblique to the planes of the three-dimensional array.

The control method according to the present embodiment is provided for the servo motor device 1 with the motor section 3 and the reduction gear 4, wherein the motor section 3 is configured to generate a driving force, and the reduction gear 4 is configured to output the driving force by reducing a speed of rotation of the motor section 3, the method comprising: acquiring detected information about operation of the motor section 3 by the servo motor device 1; and by the servo motor device 1, generating an approximate curve based on a behavior in a time sequence of a lifetime prediction parameter, and calculating predicted lifetime information (remaining lifetime period RT) of the servo motor device 1 based on the approximate curve thus generated, wherein the lifetime prediction parameter has been calculated by means of the detected information. The control method according to such an embodiment can provide a similar effect(s) to the servo motor device 1 according to the embodiment as described above.

Finally, the effect(s) described in the present disclosure is not limiting, but shown by way of example, wherein an embodiment is also possible which provides another effect, or partially provides the effect(s) described in the present disclosure. Furthermore, the embodiment(s) described in the present disclosure is merely an example, and the technical scope of the present invention is not limited to the above-described embodiment(s). Therefore, it is to be understood that various modifications other than the above-described embodiment(s) are also possible depending on the design etc. within a scope which does not depart from the technical idea of the present invention. It is to be noted that not all of combinations of features described in the embodiment(s) may not be necessarily essential to achieve the objective.

REFERENCE SIGNS LIST

1 Servo motor device
2 Control device
3 Motor section
4 Reduction gear
5 Various sensors
6 Memory section
21 Operation controlling section
22 Detecting section
23 Storage controlling section
24 Computing section
51 Input voltage sensor
52 Input current sensor
53 Output voltage sensor 54 Output current sensor
55 Motor output shaft encoder
56 Reduction gear output shaft encoder
57 Temperature sensor

What is claimed is:

1. A servo motor device comprising:
a motor section configured to generate a driving force;
a reduction gear configured to output the driving force by reducing a speed of rotation for the motor section;
a detecting section configured to acquire detected information about operation of the motor section; and
a computing section configured to generate an approximate curve based on a behavior for a time sequence of a parameter and to calculate predicted lifetime information of the servo motor device based on the approximate curve thus generated, wherein the parameter has been calculated by means of the detected information.

2. The servo motor device according to claim 1, further comprising
a memory section configured to store the detected information in a storage area, wherein the storage area is provided for each predetermined numerical range,
wherein the memory section is configured to store the detected information in a storage zone of the storage area, the storage zone being associated with the predetermined numerical range.

3. The servo motor device according to claim 2,
wherein the memory section is configured to store the detected information, wherein averaging has been performed between the detected information and a value previously stored in the associated storage zone.

4. The servo motor device according to claim 1,
wherein the computing section is configured to calculate one or more of a torque constant, an inertial moment, a viscous resistance, a static friction coefficient, a gravity influence coefficient, a backlash amount, an energy efficiency, a high frequency vibration coefficient, a natural frequency, a heat generation coefficient, a heat dissipation coefficient, and/or a maximal static friction force of the reduction gear as the parameter.

5. A control method for a servo motor device with a motor section and a reduction gear, wherein the motor section is configured to generate a driving force, and the reduction gear is configured to output the driving force by reducing a speed of rotation of the motor section, the method comprising:
acquiring detected information about operation of the motor section by the servo motor device; and
by the servo motor device, generating an approximate curve based on a change in a time sequence of a parameter, and calculating predicted lifetime information of the servo motor device based on the approximate curve thus generated, wherein the parameter has been calculated by means of the detected information.

* * * * *

UNITED STATES PATENT AND TRADEMARK OFFICE
CERTIFICATE OF CORRECTION

PATENT NO. : 11,707,850 B2
APPLICATION NO. : 17/385362
DATED : July 25, 2023
INVENTOR(S) : Shotaro Kudo et al.

It is certified that error appears in the above-identified patent and that said Letters Patent is hereby corrected as shown below:

In the Specification

Column 10, Line 60, "$W_{in}$ mot" should be --$W_{in\_mot}$--.

Column 11, Line 54, "$R_\alpha I^2$" should be --$R_a I^2$--.

Column 11, Line 60, "$R_\alpha$" should be --$R_a$--.

Column 11, Line 62, "$K_\alpha$" should be --$K_a$--.

Column 12, Line 1, "$K_\alpha$" should be --$K_a$--.

Column 12, Line 9, "$R_\alpha$" should be --$R_a$--.

Signed and Sealed this
Tenth Day of October, 2023

Katherine Kelly Vidal
*Director of the United States Patent and Trademark Office*